United States Patent
Feldes et al.

(10) Patent No.: US 7,437,292 B2
(45) Date of Patent: Oct. 14, 2008

(54) DIALOG SYSTEM FOR A MAN-MACHINE INTERACTION HAVING COOPERATING DIALOG DEVICES

(75) Inventors: Stefan Feldes, Pfungstadt (DE); Karlheinz Schuhmacher, Riedstadt (DE)

(73) Assignee: Deutsche Telekom AG, Bonn (DE)

( * ) Notice: Subject to any disclaimer, the term of this patent is extended or adjusted under 35 U.S.C. 154(b) by 741 days.

(21) Appl. No.: 10/451,138

(22) PCT Filed: Oct. 31, 2001

(86) PCT No.: PCT/EP01/12612

§ 371 (c)(1),
(2), (4) Date: Jun. 18, 2003

(87) PCT Pub. No.: WO02/51108

PCT Pub. Date: Jun. 27, 2002

(65) Prior Publication Data

US 2004/0039636 A1 Feb. 26, 2004

(30) Foreign Application Priority Data

Dec. 18, 2000 (DE) ............................... 100 63 148

(51) Int. Cl.
*G10L 11/00* (2006.01)
*G10L 21/00* (2006.01)
*H04M 1/64* (2006.01)
*H04M 3/42* (2006.01)

(52) U.S. Cl. ............... 704/270; 379/74; 379/88.01; 379/213.01

(58) Field of Classification Search ............... 379/47
See application file for complete search history.

(56) References Cited

U.S. PATENT DOCUMENTS

| | | | |
|---|---|---|---|
| 4,677,611 A * | 6/1987 | Yanosy et al. | 370/401 |
| 4,979,206 A | 12/1990 | Padden et al. | |
| 5,315,705 A | 5/1994 | Iwami et al. | |
| 5,546,452 A | 8/1996 | Andrews et al. | |
| 5,652,785 A | 7/1997 | Richardson, Jr. et al. | |
| 5,729,601 A * | 3/1998 | Murai | 379/269 |
| 6,144,938 A | 11/2000 | Surace et al. | |

FOREIGN PATENT DOCUMENTS

| | | |
|---|---|---|
| DE | 40 27 348 | 3/1991 |
| DE | 196 35 754 | 3/1998 |
| WO | WO 96/18260 | 6/1996 |
| WO | WO 97/43707 | 11/1997 |
| WO | WO 98/50907 | 11/1998 |

* cited by examiner

*Primary Examiner*—David R. Hudspeth
*Assistant Examiner*—Justin W Rider
(74) *Attorney, Agent, or Firm*—Kenyon & Kenyon LLP

(57) ABSTRACT

A system and method for a dialog system which provides for a user to carry on a dialog with dialog experts having different capabilities, during an existing dialog session. A terminal device may be connected to a special switching device, which, in dependence upon a communicated user statement, may provide the user with the optimal system statement from a multiplicity of system statements received from various dialog devices.

13 Claims, 4 Drawing Sheets

DIALOG SYSTEM FOR A MAN-MACHINE INTERACTION HAVING COOPERATING DIALOG DEVICES

FIELD OF THE INVENTION

The present invention relates to a dialog system for a man-machine interaction, which the user can use to communicate with various dialog experts.

BACKGROUND INFORMATION

Automated, goal-directed, interactive voice-communication systems or information systems operable by natural speech are available, which are able to access databases and which lead the user, through targeted questions, to desired information, to a transaction or the like. The dialog is carried out in a very rigid sequence of system questions and user responses. Examples of such goal-directed interactive voice-communication systems are, inter alia, telephone banking systems or card-reservation systems. The goal-directed dialog systems include targeted querying of the user information necessary for a specific application.

However, some users have indicated that systems of this kind are not flexible enough in their current state of development. This is because user statements which are not modeled in the application of the particular interactive voice-communication system, cannot be interpreted and can lead to irresolvable dialog situations. These irresolvable dialog situations involve the interactive voice-communication system entering into a state where the same text is always output or the connection is interrupted.

In addition to such goal-directed dialog systems, there are also so-called chat dialog systems or 'chat bots.' A chat bot gives the user the impression that the user can carry on a conversation with it about nearly any subject. Such a "chat-oriented" dialog system supports a very free formulation of questions, responses, and explanations, on the user side, so that a chatty-type dialog can take place between man and machine. In such a chat-oriented dialog system, any user inputs at all are answered without being rejected. However, a chat-oriented dialog system is not suited for conducting a goal-directed informational dialog where it is necessary, for example, to query specific user information before the corresponding information can be found and output. For that reason, chat-oriented dialog systems or chat bots are sometimes criticized by users as not being proficient enough, since neutral and pointless system remarks are sometimes produced in response to non-modeled user statements. Thus, in some available systems, a user was only able to be connected directly and inflexibly to a goal-directed dialog expert or to a chat-oriented dialog expert or chat bot.

SUMMARY OF THE INVENTION

Exemplary embodiments and/or exemplary methods of the present invention provide users with a dialog system characterized by greater efficiency and flexibility.

Exemplary embodiments and/or exemplary methods of the present invention provide that a user will no longer have to communicate in a rigid and inflexible manner in a session with one single dialog system. Instead, the user may make contact with a special switching device, which, in dependence upon his user statement, provides him with the optimal system statement from a multiplicity of system statements from various dialog devices. User and system statements discussed herein may be both responses and questions transmitted by a terminal device assigned to the user or by dialog devices. It can be, therefore, the task of the switching device to receive a user statement produced by the user, to relay it to a plurality of dialog devices, to wait for the system statements from the dialog devices, and, in accordance with a defined logic, to output the most suitable system statement to the user.

Some dialog devices may be generally available, goal-directed dialog devices and chat bots, which support an interaction with a user in the form of dialogs. Such dialog devices herein may also be referred to as dialog experts.

Exemplary embodiments and/or exemplary methods of the present invention provide a dialog system for a man-machine interaction, which has at least one terminal device where a user may input a user statement. The user statement may be input into the terminal device, for example, by voice and by using a microphone. It may also be entered via a keyboard. To achieve a high level of user friendliness, the user statement may also be entered in natural speech form, i.e., in natural sentences and questions. However, the manner in which a user statement is entered may not be essential for the present invention. At least one first switching device may be also provided, which is able to be connected to the terminal device. Assigned to the first switching device may be a plurality of dialog devices, which, in an available manner, are able to receive, analyze, and process user statements, in order to subsequently generate an appropriate system message. A system message includes a system statement intended for the terminal device, an identification code identifying the particular dialog device, and/or an identifier. The identifier may correspond to a hard decision, which, for example, merely signals to the first switching device whether a dialog device may or may not generate a system statement in response to a user statement. The identifier may also correspond to a soft decision, i.e., it indicates which performance or quality a generated system statement has. This means that it indicates the degree to which the generated system statement applies to the previously analyzed user statement.

In exemplary embodiments and/or exemplary methods, to be able to offer the user an optimal dialog, the first switching device may have a first device for relaying a user statement coming from a terminal device to at least some of the assigned dialog devices, as well as a second device, which, functioning in response to the system messages received from the dialog devices, selects a system message, and transmits the system statement contained therein to the terminal device.

In exemplary embodiments and/or exemplary methods of the present invention, to be able to communicate an optimized system statement, which may be a system response or a system question, to the user, the second device of the first switching device may have a detector device for capturing the identifier and the identification code which are received in a system message. In addition, a memory device for storing a priority list may be included in the second device. Using the priority list and the output signal from the detector device, a decision device, which may be separately designed or integrated with the detector device, may select the system statement of a specific dialog device, in order to relay it to the terminal device. The priority list may contain the identification codes of each dialog device assigned to the first switching device, as well as the priority assigned to the particular dialog device.

In exemplary embodiments and/or exemplary methods of the present invention, since the system messages received by the dialog devices may not be able to be simultaneously processed in the first switching device, for example, because the system messages from various dialog systems arrive at different points in time, the second device of the first switching device may be provided with a memory for storing the received system messages or also only the system statements.

In exemplary embodiments and/or exemplary methods of the present invention, the decision device may be designed, for example, to apply the identification code of the selected dialog device as a memory address to the memory. This may enable the system statement to be transmitted to the terminal device.

In exemplary embodiments and/or exemplary methods of the present invention, to be able to connect the terminal device to dialog devices of various manufacturers, and various dialog devices to the existing dialog system without substantial outlay, a user interface may be assigned to the terminal device to provide a first communication protocol and/or data format for exchanging data with the first switching device. Moreover, each dialog device may have an interface for preparing a second communication protocol and/or data format for exchanging data with the first switching device. Also, the first device of the first switching device may have a conversion device for converting the first communication protocol and/or data format into the second communication protocol and/or data format and vice versa.

In exemplary embodiments and/or exemplary methods of the present invention, in order to avoid the situation, for example, where a user has to wait an unreasonable length of time for a response from a dialog device, a timer may be provided in the first switching device to monitor the receipt of a system message within a preset time span. For example, following expiration of the preset time span, the user statement may be transmitted once more by the first switching device to the dialog devices, or, for example, the first switching device considers only the system statements received within the preset time span.

In exemplary embodiments and/or exemplary methods, both the first switching device and the dialog devices involved in a corresponding dialog may record the frequency with which their system statements are transmitted to the terminal device. For this, the first switching device may have a confirmation device, for example, which transmits a confirmation message to the dialog device whose system statement has been relayed to the terminal device. Accordingly, at least some of the dialog devices may have a device for counting and analyzing the confirmation messages received. In this manner, it may be possible, for example, that a goal-directed dialog device, which has no longer been included in the dialog for a specific time span, generates a predefined, goal-directed system message, which is switched through by the detector device and the decision device in the first switching device, directly to the terminal device.

In exemplary embodiments and/or exemplary methods of the present invention, by recording the frequency with which system statements are relayed to a dialog device, the priority list may be dynamically adapted, during an existing dialog, to the dialog sequence. For example, a dialog device may be assigned a higher priority in the priority list afterwards, when, for example, the system statements of this dialog device are relayed very frequently to the terminal device. It is also possible that the user himself is able to change the priority list, by informing the first switching device of the type of dialog desired. In this manner, from the outset, a higher priority in the priority list may be assigned to the appropriate dialog device, in dependence upon the dialog desired by a user.

In exemplary embodiments and/or exemplary methods of the present invention, to further optimize the dialog system, a sub-switching device may be assigned to each dialog device, it being possible, in turn, for a plurality of sub-dialog devices to be assigned to each sub-switching device. For this purpose, the sub-switching device may have a device, which transmits a user statement relayed by the dialog device, to at least some of the assigned sub-dialog devices. In addition, a device may be provided, which, functioning in response to the system messages received by the sub-dialog devices, selects a system message and transmits it to the first switching device. Following this pre-weighting of system messages, in the manner described above, the first switching device then may select the system message whose system statement is to be transmitted to the terminal device.

In exemplary embodiments and/or exemplary methods of the present invention, the performance and precision of the dialog system may be enhanced by connecting a second switching device between the terminal device and a plurality of first switching devices. The second switching device may have a first device for relaying a user statement coming from the terminal device to at least some of the first switching devices. In addition, a second device may be provided, which functioning in response to the system messages coming from the first switching device(s), to select a system message and transmit the system statement contained therein to the terminal device. In this approach, the first switching device must be designed for relaying a selected system message to the second switching device. That is, the first switching device not only may transmit the system statement but also may transmit the identifier from the dialog device in question that is integrated in the system message and the identification code.

In exemplary embodiments and/or exemplary methods of the present invention, the switching devices and/or sub-switching devices may be designed to be able to inform the dialog devices or sub-dialog devices in question, of the dialog end. In this connection, the end of the dialog may be initiated by a specific dialog device, sub-dialog device, or by the user himself, for example, by hanging up the telephone receiver.

In exemplary embodiments and/or exemplary methods of the present invention, the dialog system includes at least one terminal device where a user may input a user statement. In addition, a plurality of interconnectible dialog devices may be provided, which may be connected to the terminal device. Each dialog device may have a device for receiving and analyzing a user statement generated by the terminal device, as well as a device for generating a system message in dependence upon the analyzed user statement. Moreover, a decision device may be provided for relaying the user statement to another dialog device or for relaying a generated system message to the terminal device in dependence upon the analyzed user statement. For example, the dialog devices may be connected in series, so that one dialog device always relays a user statement to the dialog device that follows next when it itself is not able to generate a system message in response to a received user statement.

DETAILED DESCRIPTION

Figure 1:
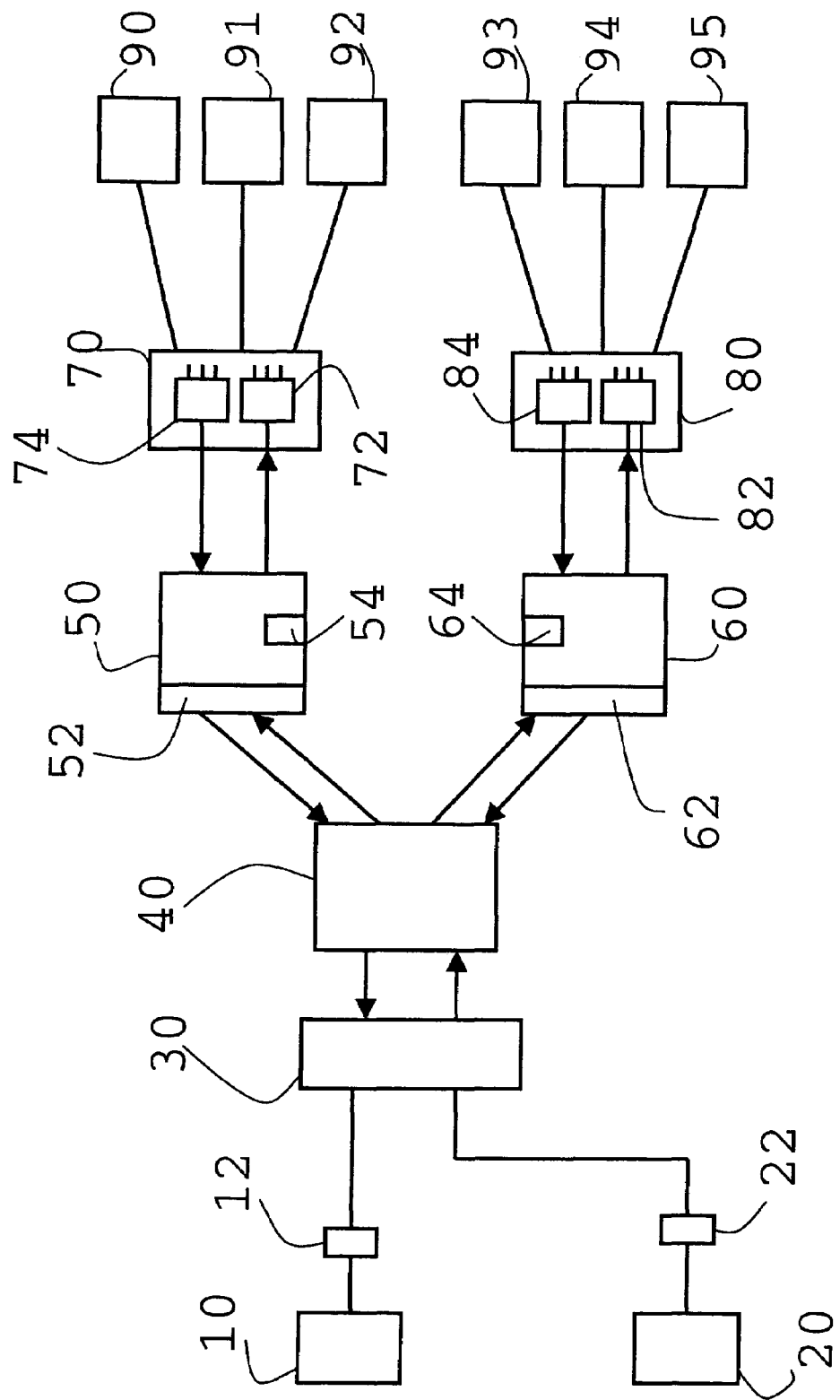
FIG. 1 shows a dialog system, including a plurality of various dialog experts, in which the present invention is implemented.

FIG. 1 shows an exemplary embodiment of a dialog system, which, for purposes of a better and simpler representation, is only shown in extract. Thus, only two terminal devices 10 and 20 are shown, which are each linked via a user interface 12 or 22 to a subscriber exchange 30. User interfaces 12 and 22 provide a communications protocol and/or data format, via which the terminal devices may exchange data with a switching device 40. For example, terminal device 10 is a telephone, and terminal device 20 a multimodal terminal. Via subscriber exchange 30, a user may establish a connection to switching device 40 by selecting a specific address. The switching device is described in greater detail in the following. Assigned to switching device 40 are a plurality of different dialog experts, of which merely the two dialog experts 50 and 60 are shown. In the following description, it may be assumed that dialog expert 50 is suited for a goal-directed dialog, for example, for a directory assistance, and that dialog expert 60 represents a so-called chat bot for a chat-oriented dialog.

Dialog experts 50 and 60 each have interfaces 52 and 62, respectively, which provide a specific communications protocol and/or data format for exchanging data with switching device 40.

Figure 4:
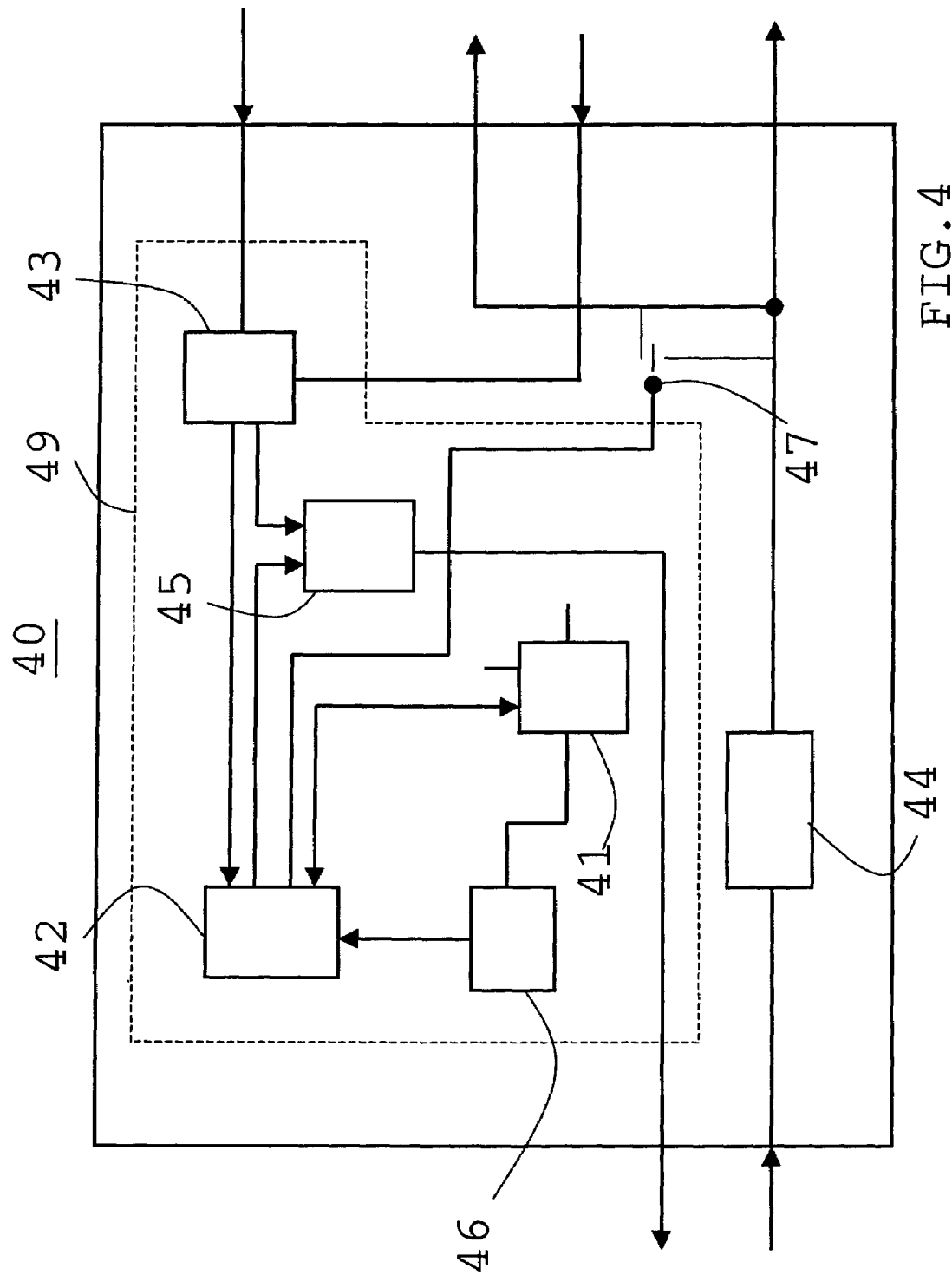
FIG. 4 shows a basic block diagram of a switching device in accordance with the present invention, according to FIG. 1.

An exemplary switching device 40 is shown in FIG. 4. Switching device 40 has a conversion device 44, which adapts the communications protocol and/or data format between interfaces 52 and 62 of dialog experts 50 and 60, respectively, and user interfaces 12 and 22 of terminal devices 10 and 20, respectively. This makes it possible for any desired terminal devices to be connected to any desired dialog experts. In addition, switching device 40 shown in FIG. 4 has a detector device 43, which is provided for recording system messages that may be generated by dialog experts 50 and 60. A system message is composed, for example, of the actual system statement intended for a terminal device, an identification code of the particular dialog expert, and of an identifier. The identifier may correspond to a hard decision which merely signals that the system message includes a system statement. The identifier may also correspond to a soft decision, in that it indicates the quality of a system statement with respect to an analyzed user statement. For a hard decision, the identifier may be represented by the binary digit "0", i.e., no system statement has been generated, or by a "1", i.e., a system statement has been generated. When an indication of the quality of the system statement is provided, the identifier may represent a number between 0 and 100, in order to define the measure of the quality. Thus, for example, number 100 corresponds to a system statement which applies optimally to the analyzed user statement.

Detector device 43 may be able to capture the identifier and identification code of a received system message, and feed them to a decision device 42. In addition, decision device 42 is connected to a memory 46, in which a priority list is stored. In the present example, the priority list includes the identification codes of the two dialog experts 50 and 60, as well as the priorities assigned to the two dialog experts. For example, dialog expert 50 enjoys a higher priority than dialog expert 60. Detector device 43 may be linked to a memory 45 in which the entire system message or merely the system statement contained in a system message is stored. Decision device 42 is likewise connected to memory 45, in order to be able to select predefined system statements to be relayed to a terminal device. To this end, decision device 42 has a logic, which, in dependence upon the priority list in memory 46 and the identifier captured in a system message by detector 43, is able to decide whether the system message of dialog expert 50 or of dialog expert 60 should be relayed to a terminal device. In addition, decision device 42 may generate a confirmation message for the dialog expert, whose system statement has been relayed to a terminal device. Via a switch 47, the generated confirmation message is placed on the output line which leads to the appropriate dialog expert.

A control unit 41, which monitors and controls switching device 40, may, for example, log how often a system statement of the two dialog experts 50 and 60 has been relayed during a dialog session to the corresponding terminal device.

In addition, dialog experts 50 and 60 may each have a counting and evaluation device 54 and 64, respectively, to determine the frequency of the system messages generated by them and relayed to a terminal device during a dialog session with a terminal device. Counting and evaluation devices 54 and 64 also may assure that a dialog expert is able to generate a predefined, preferably goal-directed system statement, when, within a preset time span, no more system statement from it has been relayed by switching device 40 to a terminal device. This predefined system statement may be immediately switched through by the switching device to the terminal device.

Depending upon how many generated system statements have been relayed by dialog experts 50 and 60 to the particular terminal device, control unit 41 may undertake an adaptation of the priority list in memory 46. Should it turn out, namely, during a dialog session that the system statements from dialog expert 60 are made available much more frequently than from dialog expert 50, then, during this dialog session, dialog expert 60 may be assigned a higher priority than dialog expert 50. It is likewise conceivable to render possible a user-controlled adaptation of the priority list for a specific dialog session. If, for example, the user merely wants to "chat", and no goal-directed information is needed, then, via his terminal device, he may transmit a control parameter to this effect to switching device 40, whereupon control unit 41 raises the priority of dialog expert 60 with respect to dialog expert 50. The priority list may also or instead reflect the usage of the participating dialog experts, the highest priority being assigned to the dialog expert having the lowest usage. For this purpose, each dialog expert may determine his usage and make this available to the assigned switching device. Moreover, the switching exchange itself could estimate the usage of the participating dialog experts on the basis of the corresponding response times.

To be able to offer the user a higher dialog quality, a sub-switching device 70 may be assigned to dialog expert 50, and a sub-switching device 80 to dialog expert 60. Three further dialog experts, 90, 191, and 90 are assigned to sub-switching device 70, whereas three other dialog experts 93, 94 and 95 are assigned to sub-switching device 80. In principle, sub-switching devices 70 and 80 may be designed similarly to switching device 40. Thus, sub-switching devices 70 and 80 each have devices 72 and 82, respectively, which retransmit the user statement relayed by the particular dialog expert 50 or 60 to at least some of the assigned sub-dialog experts 90 through 92 and 93 through 95, respectively. Conversely, the design of sub-switching devices 70 and 80 may also include detector and decision devices 74 and 84, respectively, which, functioning in response to the system messages received from sub-dialog experts 90 through 92 and 93 through 95, respectively, select a system message and transmit this directly or via assigned dialog experts 50 or 60 to switching device 40.

Figure 2:
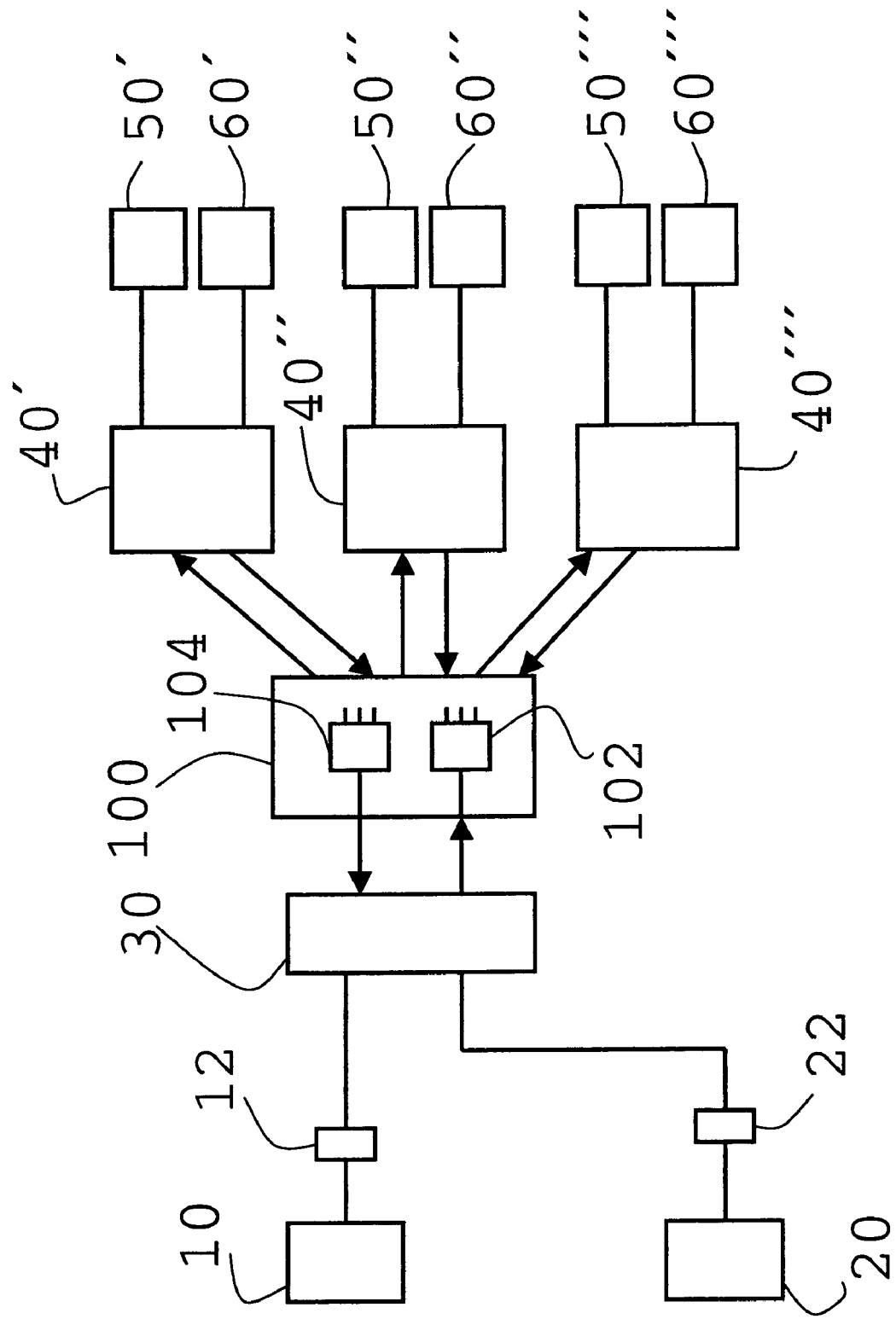
FIG. 2 illustrates another embodiment of a dialog system, in which the present invention is implemented.

FIG. 2 shows another exemplary embodiment of a dialog system which may offer a user an improved dialog. Two terminal devices 10 and 20 are connected, in turn, via corresponding user interfaces 12 and 22, respectively, to a subscriber exchange 30. Subscriber exchange 30 may connect terminal devices 10 and 20 to a main switching device 100, which is connected, in turn, to a plurality of switching devices. To simplify the illustration, only three switching devices 40', 40" and 40''' are shown. Switching device 40' is connected, for example, to two dialog experts 50' and 60', switching device 40" to dialog experts 50" and 60", and third switching device 40''' to dialog experts 50''' and 60'''. Main switching device 100 has a transmission device 102, which relays the user statement coming from a terminal device to at least some of switching devices 40', 40" and 40'''. Switching device 40 according to FIG. 1 differs from switching devices 40', 40" and 40''' according to FIG. 2 in that the last-mentioned switching devices not only relay the system statement, but the entire system message of a selected dialog expert, to main switching device 100. To this end, main switching device 100 has a detector and decision device 104, which, functioning in response to the system messages coming from switching devices 40', 40" and 40''', selects an optimal system message and routes the system statement contained therein to the corresponding terminal device 10 or 20.

Figure 3:
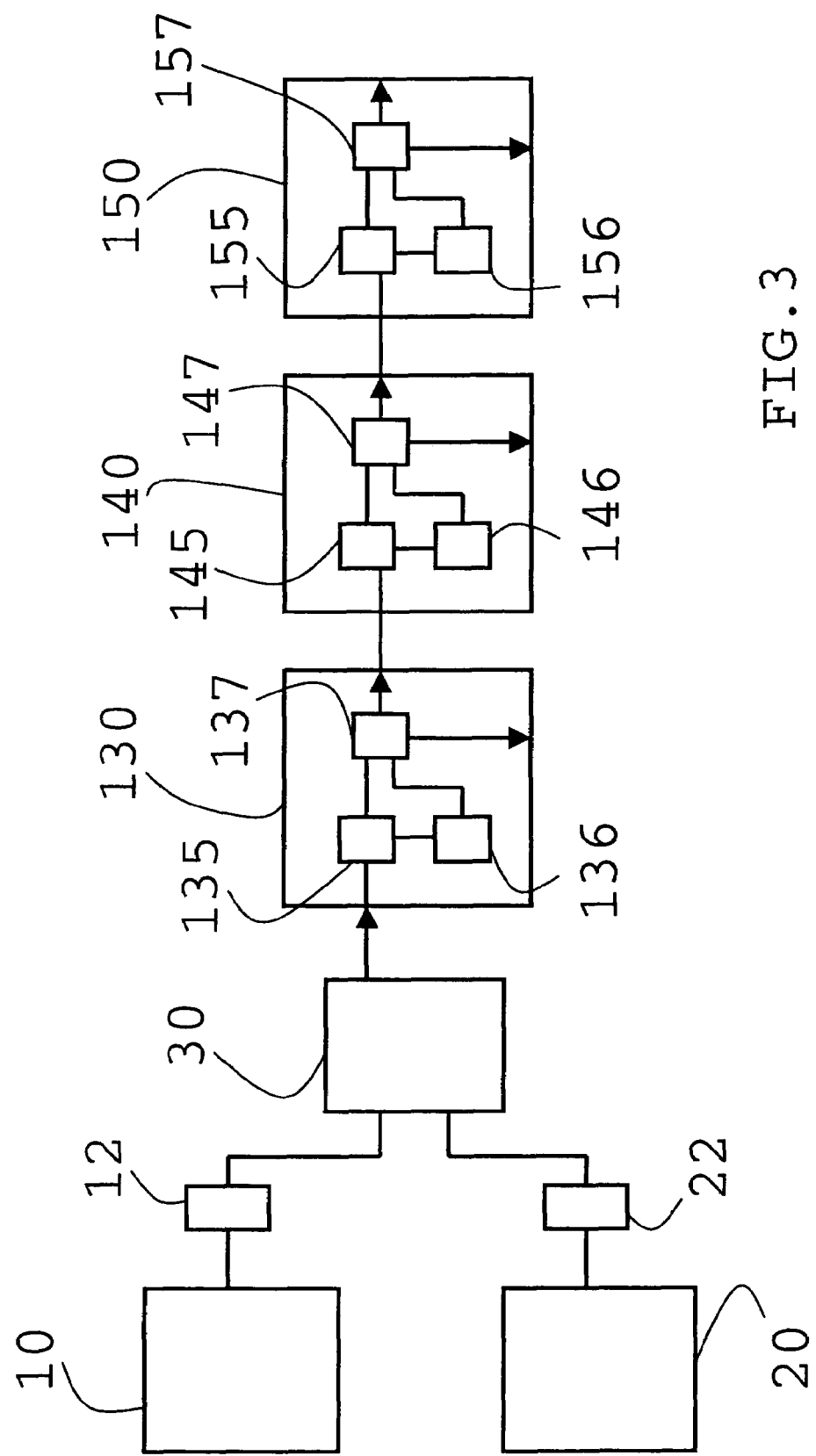
FIG. 3 depicts another embodiment of a dialog system according to the present invention, including dialog experts connected in series.

FIG. 3 shows another exemplary embodiment of a dialog system, in which terminal devices 10 and 20 are connected, in turn, via corresponding user interfaces 12 and 22, respectively, to a subscriber exchange 30. In addition, the dialog system has a cascade connection of, for example, three dialog experts 130, 140, and 150, which are able to carry on a dialog with terminal devices 10 and 20. Each dialog expert 130, 140 and 150 has a receiving and evaluation device 135, 145 and 155, respectively, for receiving and evaluating a user statement generated by a terminal device. Moreover, each dialog expert 130, 140 and 150 includes a device 136, 146 and 156, respectively, for generating a suitable system message as a function of the evaluated user statement. A decision device 137, 147 and 157 is provided in each dialog expert 130, 140, and 150. Decision devices 137, 147, and 157 may relay the user statement obtained from an end device to the following dialog expert when it is recognized that the dialog expert in question is not able to generate a suitable system statement in response to the received user statement. In addition, decision devices 137, 147 and 157 may be able to transmit a generated system statement to the particular terminal device. It is assumed in the present example that terminal device 10 has been connected via exchange 30 to dialog expert 130. It is also assumed that dialog expert 130 is not able to generate any suitable system statement in response to the user statement coming from terminal device 10, so that the user statement is relayed to dialog expert 140. Since dialog expert 140 is able to generate an appropriate system statement, a connection is established at this point between terminal device 10 and dialog expert 140, and the generated system statement is transmitted to terminal device 10.

It is also noted that all switching devices, sub-switching devices, dialog devices, and sub-dialog devices may be designed for the parallel, i.e., simultaneous handling of dialogs with a plurality of users.

With the aid of the proposed dialog systems, it may be possible to insert chat-oriented passages within predominately goal-directed dialog sessions, to prevent a dialog from being broken off or ending in a dialog loop when a goal-directed dialog expert may no longer be able to meaningfully respond to a user statement. User statements which lie outside of the modeled domain of a goal-directed dialog expert, may then be handled in the "chatty style", with the aid of a so-called chat bot. Thus, the possibility is opened up of going beyond the existing technological boundaries of the individual dialog experts in a user-friendly way. Overall, therefore, the performance of the proposed dialog systems allows for the ability to handle deviations in user objectives, and to more successful and user-friendlier dialogs.

What is claimed is:

1. A dialog system for a man-machine interaction having cooperating dialog devices, comprising:
    at least one terminal device, where a user inputs a user statement;
    at least one first switching device, which is connected to the terminal device;
    a plurality of dialog devices, which are assignable to the at least one first switching device and which, functioning in response to a user statement, are able to generate system messages;
    wherein the at least one first switching device includes:
        a first device for relaying a user statement coming from the at least one terminal device to at least some of the assigned dialog devices of the plurality of dialog devices; and
        a second device, which, functioning in response to the system messages received from the assigned dialog devices, selects a system message and transmits the system statement contained therein to the at least one terminal device,
    wherein the system message generated by a dialog device, functioning in response to a user statement, includes a system statement intended for the terminal device, an identification code identifying the dialog device, and/or an identifier, the identifier signals whether or not a system statement has been generated for a terminal device, or what quality the generated system statement has; and the second device of the first switching device has a detector device for capturing the identifier and the identification code of a system message, a memory for storing a priority list of the assigned dialog devices, and a decision device, which, using the stored priority list and the output signal from the detector device, selects the system statement of a specific dialog device in order to relay it to the terminal device.

2. The dialog system as recited in claim 1, wherein the second device of the at least one first switching device has a memory for storing received system messages.

3. The dialog system as recited in claim 1, further comprising
    a user interface assigned to the at least one terminal device to provide at least one of a first communication protocol and a first data format for exchanging data with the at least one first switching device,
    wherein at least the assigned dialog devices each have an interface for providing at least one of a second communication protocol and a second data format for exchanging data with the at least one first switching device, and
    the first device of the at least one first switching device has a conversion device for converting at least one of: the at least one of the first communication protocol and the first data format into the at least one of the second communication protocol and the second data format and the at least one of the second communication protocol and the second first data format into the at least one of the first communication protocol and the first data format.

4. The dialog system as recited in claim 1, wherein the at least one first switching device has a timer for monitoring receipt of the system message within a preset time span.

5. The dialog system as recited in claim 1, wherein the at least one first switching device has a confirmation device for transmitting a confirmation message to the assigned dialog device whose system statement has been relayed to the at least one terminal device.

6. The dialog system as recited in claim 5, wherein at least some of the plurality of dialog devices have a respective counting and analyzing device for counting and analyzing received confirmation messages.

7. The dialog system as recited in claim 6, wherein functioning in response to the counting and analyzing devices, the at least some of the plurality of dialog devices are able to generate a predefined system message, and functioning in response to a predefined system message, the detector device in the first switching device prompts the decision device to transmit a corresponding system statement to the at least one terminal device.

8. The dialog system as recited in claim 1, wherein the priority list stored in the at least one first switching device is modifiable.

9. The dialog system as recited in claim 1, wherein a respective sub-switching device is assigned to each dialog device of the plurality of dialog devices and a plurality of sub-dialog devices are assigned to each respective sub-switching device.

10. The dialog system as recited in claim 9, wherein each sub-switching device includes:
    a transmitting device for transmitting the user statement relayed by the assigned dialog device to at least some of the assigned sub-dialog devices; and
    a selecting device, which, functioning in response to the system messages received from the assigned sub-dialog devices, selects a certain system message and transmits the certain system message to the at least one first switching device.

11. The dialog system as recited in claim 1, wherein at least one of a goal-directed dialog device and a chat-oriented dialog device is used.

12. The dialog system as recited in claim 1, further comprising at least one second switching device connected to the at least one terminal device and to a plurality of at least one first switching devices, the at least one second switching device including:
    a third device for relaying a user statement coming from the at least one second terminal device to at least some of the plurality of at least one first switching devices, and
    a fourth device, which, functioning in response to the system message received from the respective at least one first switching device, selects a certain system message and transmits a certain system statement contained therein to the at least one terminal device;
    the respective at least one first switching device being designed for relaying the certain system message to the at least one second switching device.

13. A dialog system for a man-machine interaction having cooperating dialog devices, comprising:
    at least one terminal device, where a user inputs a user statement,
    a plurality of interconnectible dialog devices, each dialog device including:
        an analyzing device for receiving and evaluating a user statement generated by the at least one terminal device;
        a generating device for generating a system message in dependence upon the analyzed user statement;
        a decision device for relaying the analyzed user statement for one of: to another dialog device and for relaying a generated system message to the at least one terminal device in dependence upon the analyzed user statement;
    wherein the system message generated by a dialog device, functioning in response to a user statement, includes a system statement intended for the terminal device, an identification code identifying the dialog device, and/or an identifier, the identifier signals whether or not a system statement has been generated for a terminal device, or what quality the generated system statement has; and the second device of the first switching device has a detector device for capturing the identifier and the identification code of a system message, a memory for storing a priority list of the assigned dialog devices, and a decision device, which using the stored priority list and the output signal from the detector device selects the system statement of a specific dialog device in order to relay it to the terminal device.

* * * * *